(Specimens.)
W. NIELSON.
FABRIC FOR WALL DECORATIONS.
No. 329,764. *Fig. 1.* Patented Nov. 3, 1885.
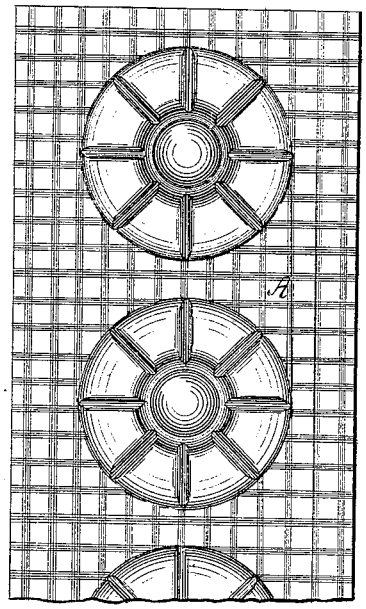
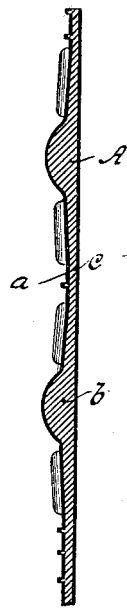
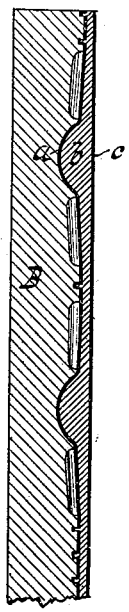
WITNESSES:
INVENTOR
William Nielson
BY
Van Santvoord & Hauff
his ATTORNEYS

UNITED STATES PATENT OFFICE.

WILLIAM NIELSON, OF NEW YORK, N. Y.

FABRIC FOR WALL-DECORATIONS.

SPECIFICATION forming part of Letters Patent No. 329,764, dated November 3, 1885.

Application filed May 28, 1885. Serial No. 166,965. (Specimens.)

*To all whom it may concern:*

Be it known that I, WILLIAM NIELSON, a citizen of the United States, residing at New York, in the county and State of New York, have invented new and useful Improvements in Wall-Decorations, of which the following is a specification.

This invention relates to a wall-decoration composed of a facing of muslin, paper, or equivalent material, an intermediate layer of a suitable plastic mass, and a backing of muslin or equivalent material, the whole being compressed in a suitable mold or die.

In the accompanying drawings, Figure 1 represents a face view of a wall-decoration formed according to my invention. Fig. 2 is a transverse section of the same. Fig. 3 is a transverse section of the mold in which the decoration is formed.

Similar letters indicate corresponding parts.

In the drawings, the letter A designates a wall-decoration formed according to my invention. It is composed of a facing, $a$, an intermediate layer, $b$, and a backing, $c$. For the backing and the facing I use textile materials—such as muslin, silk, or cloth—or I can use paper or leather, or any other material of a similar nature; and for the intermediate layer, $b$, I use a suitable plastic mass— such, for instance, as can be made from glue, alum, linseed-oil, whiting, and plaster-of-paris. I do not wish to confine myself, however, to this precise composition, since any other composition of a similar nature can be used for the purpose of producing my wall-decorations.

In order to form my wall-decorations I place the facing $a$ upon a mold, B, in the face of which are formed the designs to be reproduced by the decorations, and upon this facing I spread the layer $b$ of a plastic mass substantially such as above described. Upon the plastic layer $b$ I place the backing $c$, and then I expose the whole to pressure. When the plastic mass has set, a wall-decoration is obtained in the face of which the designs of the mold are reproduced, and which is flexible, so that it can be applied readily to an uneven as well as to an even surface. By the flexible layers $c$ and $a$ the plastic layer $b$ is protected, and a wall-decoration is obtained which is handsome and cheap, and which can be produced with a large variety of designs.

It is obvious that my decorations can be applied to the interior of railroad-cars, also to covering furniture and for similar purposes.

My decorations can be made in any desired color.

Heretofore a paper-hanging or wall-paper has been made by lining a piece of paper with felt, and then embossing such lined sheet with the desired design, after which the cavities formed in the felt lining are filled with a cement, and finally furnished with a backing of paper. My invention differs from such in that I provide a continuous layer of plastic material between an inner and an outer layer of flexible material, the whole being simultaneously pressed and united.

What I claim as new, and desire to secure by Letters Patent, is—

A wall-decoration composed of a facing, $a$, of muslin or other suitable flexible material, an intermediate continuous layer, $b$, of a suitable plastic mass, and a backing, $c$, of muslin or other suitable flexible material, the facing, the backing, and the interposed plastic layer being simultaneously pressed into the desired form, and thereby united, substantially as and for the purpose described.

In testimony whereof I have hereunto set my hand and seal in the presence of two subscribing witnesses.

WILLIAM NIELSON. [L. S.]

Witnesses:
W. HAUFF,
E. F. KASTENHUBER.